United States Patent [19]

Pickenhahn

[11] Patent Number: 5,067,524
[45] Date of Patent: Nov. 26, 1991

[54] DIFFERENTIAL PRESSURE CONTROL VALVE

[75] Inventor: Josef Pickenhahn, Plaidt, Fed. Rep. of Germany

[73] Assignee: Lucas Industries public limited company, Birmingham, England

[21] Appl. No.: 634,559

[22] Filed: Dec. 27, 1990

[30] Foreign Application Priority Data

Dec. 27, 1989 [DE] Fed. Rep. of Germany ....... 3943003

[51] Int. Cl.$^5$ ............................................. F16K 31/10
[52] U.S. Cl. ................................................. 137/627.5
[58] Field of Search .................. 137/116.3, 116.5, 627.5

[56] References Cited

U.S. PATENT DOCUMENTS 4,565,209  1/1986  Ruchser .................... 137/627.5 X
4,979,537 12/1990  Offenwanger ................ 137/116.5

FOREIGN PATENT DOCUMENTS 3722315  1/1989  Fed. Rep. of Germany .

Primary Examiner—Robert G. Nilson
Attorney, Agent, or Firm—Oblon, Spivak, McClelland, Maier & Neustadt

[57] ABSTRACT

A differential pressure control valve comprises a plunger (36) which is displaceable in a housing (30) by an electromagnet (32). By way of a stop (52) a first spring (44) presses the valve seat ($V_S$) into its inoperative position against a first seat ring (60). In moving toward the valve seat ($V_S$) the plunger (36) is cushioned by a second spring (42) before or as it touches the valve seat. Very sensitive actuation of the valve is obtained by the fact that the first spring exerts somewhat greater pressure than the second one.

6 Claims, 2 Drawing Sheets

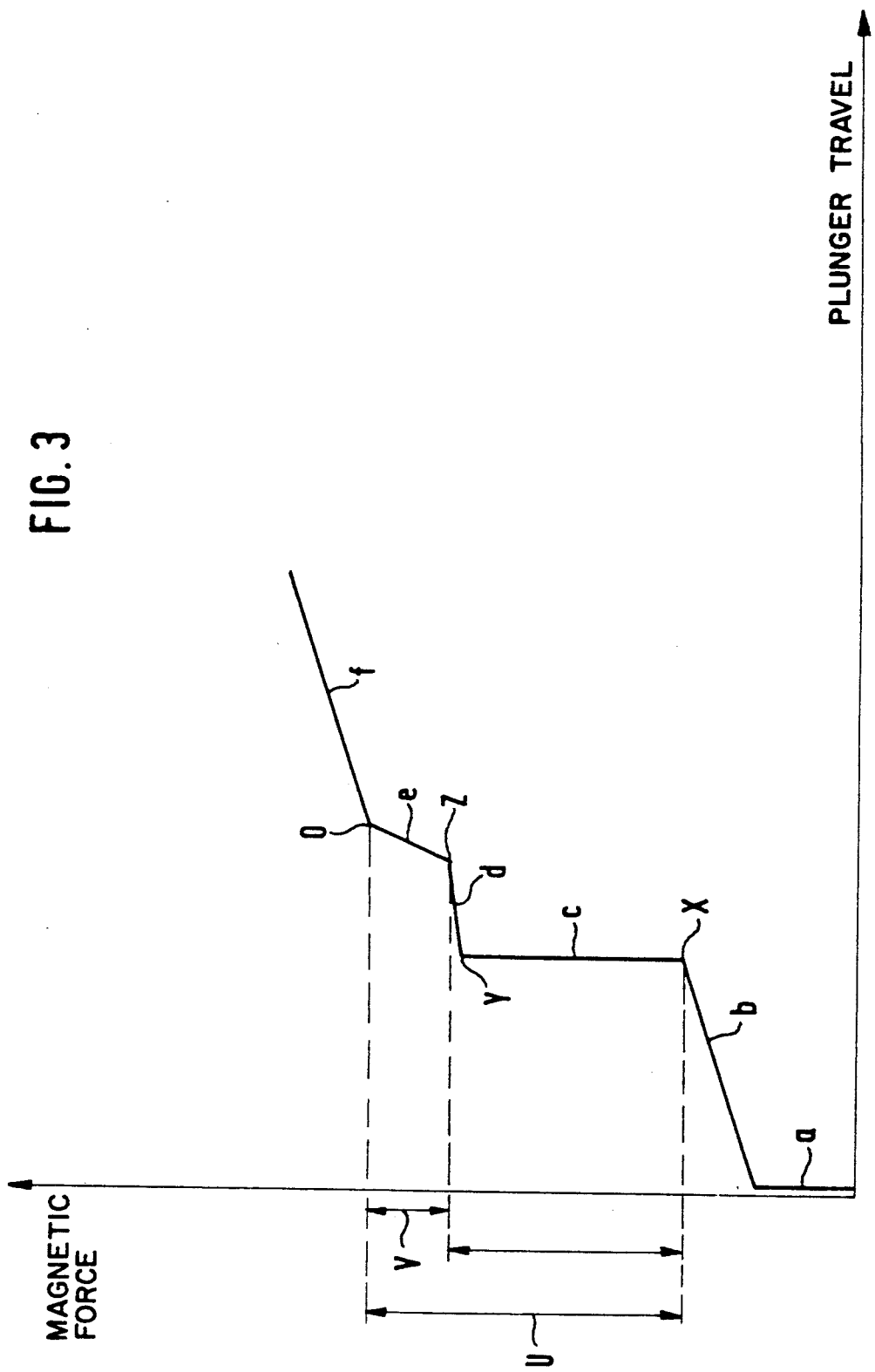

DIFFERENTIAL PRESSURE CONTROL VALVE

FIELD OF THE INVENTION

The instant invention relates to a differential pressure control valve, comprising a valve housing which has an inlet for a fluid under relatively high pressure and at least one outlet for the fluid and in which a plunger is movable axially by an electromagnet toward a valve seat biased axially in the opposite direction by a first spring.

A valve of that kind is to be used especially for control of a brake pressure booster in a motor vehicle brake system.

BACKGROUND OF THE INVENTION

A 3/2 pressure control valve of the kind mentioned initially is known from DE-OS 37 22 315, comprising two valve closing members which are supported for movement inside the valve housing. A secondary pressure is controlled in response to a force acting on one of the valve closing members and originating from an electromagnet. Springs act on the valve closing members, and the pneumatically or hydraulically effective surface areas are dimensioned such that the valve closing members will adjust in response to the desired pressures.

SUMMARY OF THE INVENTION

It is the object of the invention to provide a differential pressure control valve of simple and functionally reliable structure permitting very accurate metering of a fluid. Moreover, the valve is to be operable precisely by minor forces and have a long service life.

In accordance with the invention, the valve of the type mentioned above is characterized in that a second spring causes the plunger to enter into functional engagement with a stop connected to the valve seat, while it is being moved toward the valve seat but before or as it touches the same, and in that the pressure of the first spring is greater than of the second one.

The invention thus provides for an axially movable valve seat to be pressurized at one side by a first spring which biases the valve seat into its position of rest. At its other side, a valve plunger is displaceable axially, being moved in the direction of the valve seat upon actuation of the valve by means of an electromagnet (or another adjustment device). When the plunger hits the valve seat it can lift the same against the pressure of the first spring, whereby the valve is opened. According to the invention, however, the movement of the plunger first is cushioned by a second spring before the plunger touches the valve seat. As this second spring is weaker than the first one, the electromagnet must act with increased force on the plunger in order for the plunger to lift the valve seat from a sealing ring.

In a preferred modification of the valve according to the invention the plunger is of sleevelike design, concentrically surrounding an inner sleeve, with the above mentioned second spring being trapped between the plunger of the valve and the inner sleeve. This arrangement provides a valve structure which is easy to assemble.

In accordance with another modification, the valve seat is formed at a cuff made of elastic material, and a ring presents the stop.

In another preferred modification of the valve according to the invention, the valve seat can be pressed against a first seat ring, whereby a path of fluid from the inlet to one outlet is closed, and the plunger is formed with a second seat ring by means of which the valve seat can be lifted off the first seat ring upon axial movement of the plunger of the valve, whereby another outlet is blocked.

The term "seat ring" as used with the instant invention is not necessarily intended to mean that the ring must have an edge as sharp as the blade of a knife. Instead, the edge may be rounded as well. What is essential is that the "seat ring" can be pressed into the elastic valve seat in a manner to establish a seal.

According to another preferred development of the valve according to the invention the valve seat is embodied by a planar surface area, and the seat rings are disposed concentrically. In this case the seat rings are placed as closely as possible next to each other so that their diameters differ only a little.

BRIEF DESCRIPTION OF THE DRAWING

The invention will be described further, by way of example, with reference to the accompanying drawing, in which:

FIG. 3 is a graph showing the interdependence between the magnetic force needed to be applied to the valve and the travel of the plunger.

DESCRIPTION OF THE PREFERRED EMBODIMENTS

Figure 1:
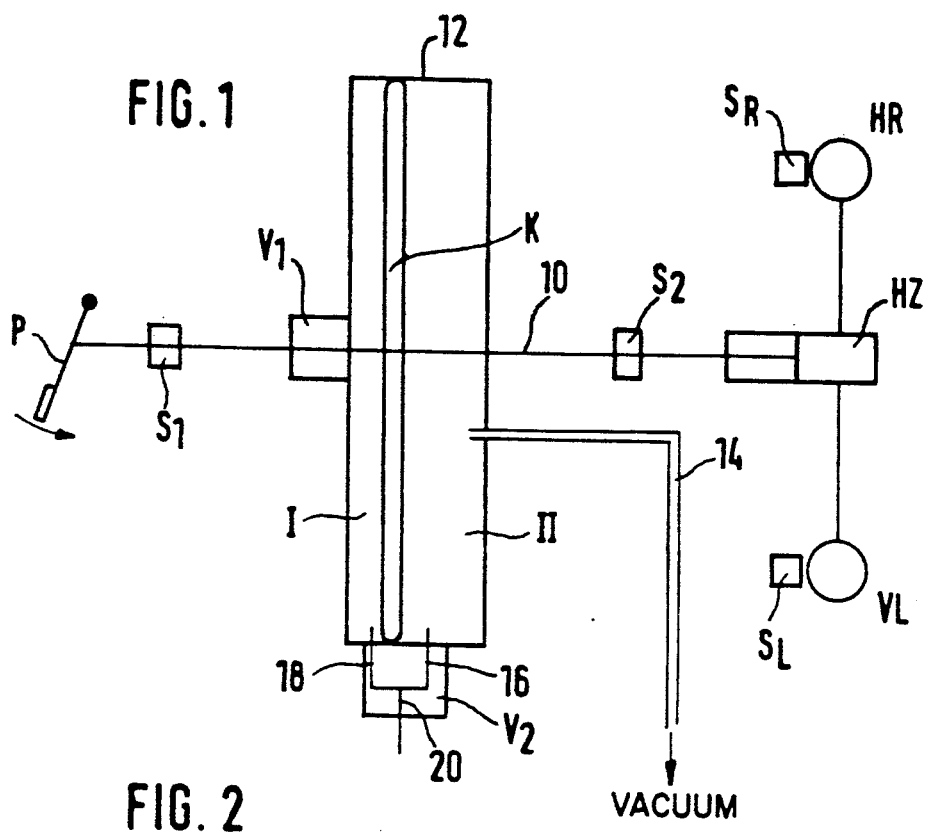
FIG. 1 is a diagrammatic presentation of a brake pressure booster in a motor vehicle brake system suitable for use of the valve according to the invention.

FIG. 1 is a diagrammatic presentation showing a brake pedal P which is moved in the direction of the arrow in order to apply the brakes. The force generated by the brake pedal is measured by a force sensor $S_1$. Downstream of the force sensor $S_1$, in the path of force 10, there is a brake pressure booster 12 comprising two chambers I, II and a plunger K which is displaceable by virtue of a difference in pressure in the chambers, as usual. The brake pressure booster 12 is followed in the path of force 10 by another force sensor $S_2$ which measures the force as increased by the pressure booster 12. The path of force 10 leads into a conventional master cylinder HZ which feeds hydraulic fluid under pressure in per se known manner into brake circuits. FIG. 1 illustrates a brake circuit consisting of a right rear wheel HR and a left front wheel VL. The wheels are equipped with per se known sensors $S_R$ and $S_L$ to detect the respective rotational speeds.

Chamber II of the brake pressure booster 12 communicates in per se known manner through a conduit 14 with a suction means so as to produce vacuum in chamber II.

As shown in FIG. 1, two valves $V_1$ and $V_2$ are provided to control the brake pressure booster 12.

Valve $V_1$ is arranged in the path of force 10. It is actuated mechanically when the brake pedal P is pushed down. In this respect the valve $V_1$ may be of known design.

In addition, an electromagnetically actuated valve $V_2$ is provided which has two valve paths. It is this electromagnetically operable valve $V_2$ which is the subject matter of the instant invention. One valve path 16, 18 interconnects the two chambers I and II of the brake pressure booster 12, while another valve path 18, 20 connects the high pressure chamber I to a source of fluid, such as the outside atmosphere. The two valve paths 16,18, on the one hand, and 18,20, on the other hand, are switched alternatively, i.e. either the two chambers I, II are interconnected to establish vacuum in both of them, or the connection between the two chambers I, II is interrupted and only chamber I is connected to the ambient atmosphere through the valve path 18,20.

Figure 2:
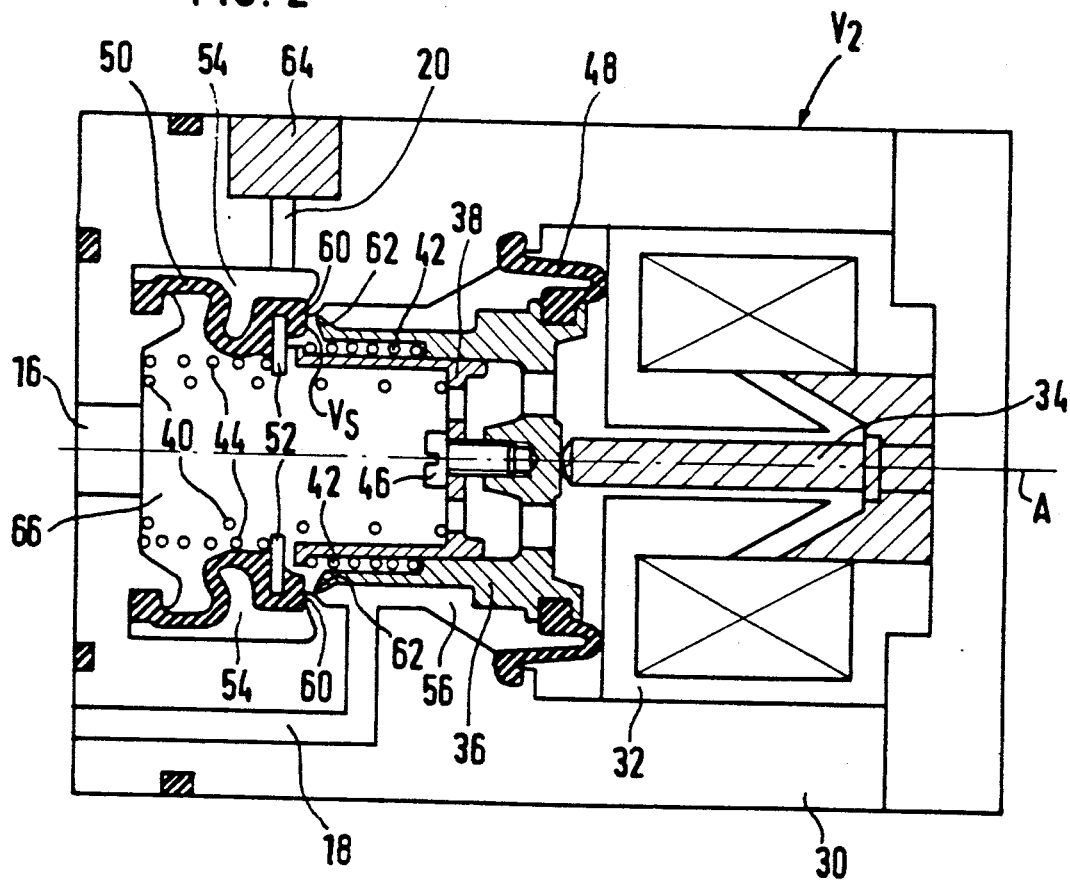
FIG. 2 shows details of the valve according to the invention in an inoperative position.

FIG. 2 shows details of the control valve $V_2$. The task of the connections 16, 18, and 20 of the valve has been described above. Connection 20 serves as the inlet for fluid under relatively high pressure, such as atmospheric air. Valve $V_2$ comprises a housing 30 in which there is an electromagnet 32. The armature 34 of the electromagnet 32 is movable axially in conventional manner along the axis A of the valve.

The armature 34 of the electromagnet 32 acts on a plunger 36 of the valve, at the left in FIG. 2, which plunger likewise is movable axially. In the plunger 36 and concentrically with the same, an inner sleeve 38 is arranged likewise for axial displacement within certain limits. A spring 40 urges both the inner sleeve 38 and the plunger 36 to the right in FIG. 2 into the inoperative position illustrated. When this position of rest is established, the connections 16 and 18 of the valve are in fluid communication so that application of the valve in a brake pressure booster as shown in FIG. 1 will submit both chambers I, II of the brake pressure booster to suction. The switching of the various paths of the valve will be described below.

Apart from the rather weak spring 40 urging the plunger into inoperative position (aided by an elastic collar 48, if desired), there are two other springs, namely one spring 42 trapped between the plunger 36 and the inner sleeve 38 and another spring 44 coaxial therewith. The pressure of spring 44 is somewhat greater than that of spring 42. FIG. 2 shows the spring 42 in relaxed condition.

A bolt 46 serves to guide the inner sleeve 38 inside the plunger 36, permitting axial relative motion between these members.

The collar 48 mentioned above is made of an elastic material and permits axial movement of the plunger 36 of the valve. The collar 48 is designed such as to bring the plunger 36 into the inoperative position shown in FIG. 2.

A cuff 50, likewise made of an elastic material, includes a valve seat $V_S$ at its face end. Firmly incorporated in the cuff 50 is a steel ring 52 which functions as a stop for the spring 44 and the inner sleeve 38.

A space 54 is left free between the housing 30 and the cuff 50, and a corresponding free space 56 is defined between the plunger 36 and the housing 30 of the valve.

A seat ring 60 is formed integrally in the housing 30. In the condition illustrated in FIG. 2 it engages the valve seat $V_S$. This engagement of the seat ring 60 with the valve seat $V_S$ blocks the inlet 20 of the valve $V_2$ so that atmospheric air cannot enter the valve.

Furthermore, the plunger 36 is formed at its end surface facing the valve seat $V_S$ with another seat ring 62 which is not yet in engagement with the valve seat in the condition illustrated in FIG. 2.

A filter 64 is positioned upstream of the inlet 20 of the valve $V_2$.

The valve $V_2$ operates as follows: When at rest, as shown in FIG. 2, both the inlet 20 and the associated circumferential free space 54 are blocked because the spring 44 presses the valve seat $V_S$ by way of the stop 52 to the right against the seat ring.

With this state of affairs, a flow path extends from the connection 16 of the valve through a free space 66, continuing through a gap between the stop 52 and the inner sleeve 38 as well as another gap between the seat rings 60, 62 and on into the passage 18. It should be understood that although FIG. 2 shows the seat rings 60,62 very closely together, air still can pass between them.

Now, if the electromagnet 32 is actuated its armature 34 will exert pressure on the plunger 36, to the left in FIG. 2. Therefore, the plunger 36 likewise moves to the left. And the inner sleeve 38, too, is moved to the left by the spring 42 until its left end edge hits the stop 52. Thereupon the movement of the inner sleeve 38 is interrupted for the time being because the spring rate of spring 42 for instance is 20% less than the spring rate of spring 44. Preferably the springs 42, 44 are selected so that the pressure of the enclosed spring 42 is from 5 to 25%, preferably from 10 to 25% less than that of the spring 44 which acts from the left on the stop 52.

The electromagnet 32 now continues to push the plunger 36 to the left in FIG. 2 until the blade edge 62 of the plunger 36 meets with the valve seat $V_S$. As that happens, the blade edge 62 presses the valve seat to the left, against the force presented by the spring 44, so that the valve seat $V_S$ is lifted off the blade edge 60 formed at the housing 30.

When the blade edge 62 of the plunger 36 is sealingly engaged with the valve seat $V_S$ the connection 16 of the valve $V_2$ is blocked. On the other hand, when the valve seat $V_S$ is lifted off the seat ring 60, as described above, a flow path is established from the inlet 20 through the free space 54 into the other free space 56 and on into passage 18. Pressurized fluid thus may flow from the inlet 20 into the passage 18.

The arrangement described of the springs permits the valve to be controlled very accurately with relatively small forces. Specifically, the trapped spring 42 "weakens" the closing effect of the spring 44 just before actuation of the valve. For, when the inner sleeve 38 hits the stop 52, the trapped spring 42 already is exerting pressure on the stop 52 and thus on the valve seat $V_S$. And this pressure is but a few percentage points less than the pressure of the closing spring 44. For this reason, relatively small force is required for actuation of the valve in the particularly critical range of valve movement in which the valve is either opened or closed.

The flow of fluid thus can be controlled very sensitively and very accurately by the valve. The valve permits precise metering and responds practically without delay.

FIG. 3 illustrates the functional interdependence between the magnetic force of the electromagnet 32 and the travel of the plunger 36, for the opening stroke described above. Initially a relatively small magnetic force is sufficient to overcome a no-load stroke on path a. Subsequently the pressure of the rather weak return spring 40 must be overcome. The inclination of curve b corresponds to the spring rate of spring 40.

At point X the inner sleeve 38 hits the stop 52. Practically the armature 34 of the electromagnet 32 comes to a standstill until the electromagnet will have developed a force sufficient to compress the trapped spring 42. That happens at point Y. Following that, the spring 42 counteracts any further movement of the armature.

Thus the inclination of curve d corresponds to the spring rate of the trapped spring 42. At point Z the seat ring 62 of the plunger 36 touches the valve seat $V_S$.

Subsequently, at curve e the rather strong spring 44 comes into action which is why this part of the curve has a steeper gradient than curve d corresponding to the slightly weaker spring. At point O the valve seat $V_S$ is lifted off the seat ring and the valve is opened.

The difference in pressure U shown in FIG. 3 is the force hysteresis which would occur in a valve including but a single spring to be overcome for opening of the valve, in other words a valve not designed according to the invention. In the case of the invention, on the other hand, only the relatively small difference in pressure V must be overcome in opening and closing of the valve. The gradient of the corresponding piece of curve e corresponds merely to the "residual force" of the spring 44 since most of the pressure thereof was eliminated already by the compressed spring 42.

What is claimed is:

1. A differential pressure control valve, comprising a valve housing (30) which has an inlet (20) for a fluid under relatively high pressure and at least one outlet (18) for the fluid and in which a plunger (36) is movable axially by an electromagnet (32) toward a valve seat ($V_S$) biased axially in the opposite direction by a first spring (44), characterized in that a second spring (42) causes the plunger (36) to enter into functional engagement with a stop (52) connected to the valve seat ($V_S$), while it is being moved toward the valve seat ($V_S$) but before or as it touches the same, and in that the pressure of the first spring (44) is greater than of the second (42) one.

2. The valve as claimed in claim 1, characterized in that the plunger (36) is sleevelike, concentrically enclosing an inner sleeve (38), and in that the second spring (42) is trapped between the plunger of the valve and the inner sleeve (38).

3. The valve as claimed in claim 1 or 2, characterized in that the valve seat ($V_S$) is formed as a cuff (50) made of an elastic material, and in that a ring is provided as the stop (52).

4. The valve as claimed in claim 1, characterized in that the valve seat ($V_S$) is adapted to be pressed against a first seat ring (60) to close a fluid path from the inlet (20) to an outlet (18), and in that the plunger (36) is formed with a second seat ring (62) adapted to lift the valve seat ($V_S$) off the first seat ring (60) upon axial movement of the plunger (36), thereby blocking another outlet (16).

5. The valve as claimed in claim 4, characterized in that the valve seat ($V_S$) is embodied by a planar radial surface, and in that the seat rings (60,62) are concentric and have slightly different diameters.

6. The valve as claimed in claim 1, characterized in that the plunger (36) is guided in the valve housing (30) by an elastic collar (48).

* * * * *